Jan. 23, 1951      J. H. STOOTMAN      2,539,378
CRANKCASE BREATHER OPENING FILTER
Filed Feb. 7, 1948
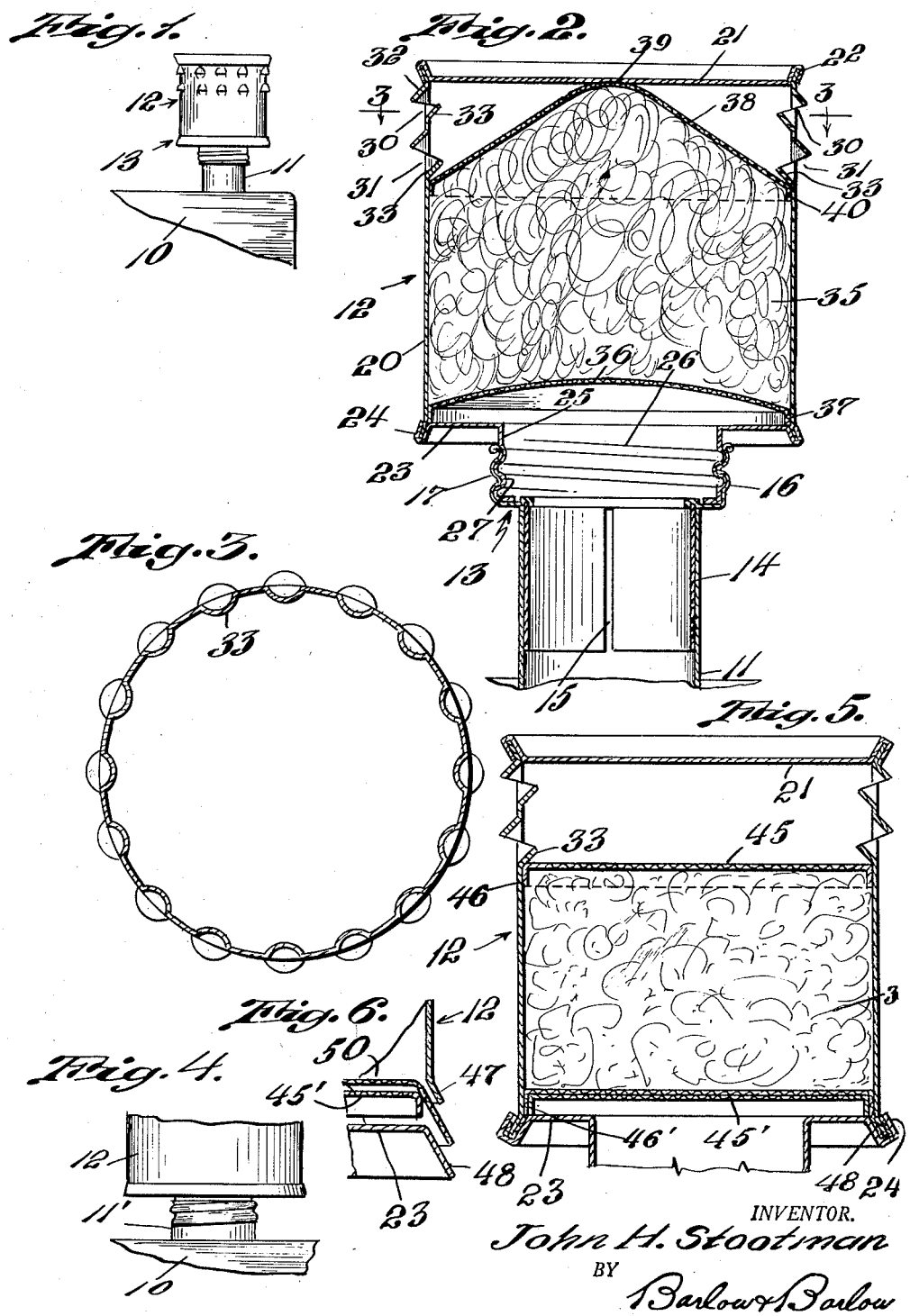
INVENTOR.
John H. Stootman
BY Barlow & Barlow
ATTORNEYS.

Patented Jan. 23, 1951

2,539,378

UNITED STATES PATENT OFFICE 2,539,378

CRANKCASE BREATHER OPENING FILTER

John H. Stootman, North Kingston, R. I., assignor to Fram Corporation, a corporation of Rhode Island Application February 7, 1948, Serial No. 6,885

8 Claims. (Cl. 121—194)

This invention relates to a filter for the air which is taken into the crankcase of an internal combustion engine.

In many internal combustion engines a breather opening is provided which may in many cases be the filler opening for the oil for the crankcase so that air may be drawn into the crankcase as the pistons reciprocate to cause a different volume of air within the enclosure. Filtering has been thought desirable for the lubricating oil of an internal combustion engine and also for the air which is taken into the carburetor. Where there are dusty conditions and air is largely charged with solid impurities in the form of dust or the like, this dust laden air will enter the crankcase through the breather opening and get into the lubricating oil making its removal desirable.

One of the objects of this invention is to remove the dust from the air which enters the crankcase so that the solid particles will be prevented from contaminating the oil and later removed by the filter.

Another object of this invention is to provide a filter which will have the efficiency somewhat in the neighborhood of a filter used for the air of the carburetor so that the air breather into the crankcase through the opening provided therefor will be relatively free of impurities.

Another object of this invention is to provide an air filter which with an adaptor may be positioned upon many different makes of internal combustion engines.

Another object of this invention is to provide a filter so arranged that its lower portion will fit into one standard size of cup fitting it, while the filter may be made in various different sizes for the accommodation of different volumes of air flow through it.

Another object of this invention is to provide a relatively simple construction of filter and adaptor so that the construction costs may be at a minimum.

Another object of the invention is to provide a filter which may be so inexpensive that it may be disposed of when it has received a certain amount of foreign particles collected from the air which passes through it and thus may be replaced by a fresh one.

Another object of the invention is to provide a filter which may be substituted for the closure cap of a filling opening for lubricating oil in such instances as are designed for use of this filling opening as a breather opening for the internal combustion engine.

With these and other objects in view, the invention consists of certain novel features of construction, as will be more fully described and particularly pointed out in the appended claims.

In the accompanying drawings:

Fig. 1 is an elevation largely diagrammatic illustrating a fragmental portion of an internal combustion engine with my air filter mounted thereon;

Fig. 2 is a central sectional view through the air filter and adaptor which is used for positioning the filter in the breather opening of the engine;

Fig. 3 is a section on line 3—3 of Fig. 2;

Fig. 4 is a sectional view illustrating a breather opening which has been threaded for the reception of a filter of the construction here illustrated;

Fig. 5 is a sectional view similar to Fig. 2 but showing a modified arrangement of the element;

Fig. 6 is a central sectional view similar to Fig. 2 but illustrating the filter element as modified.

In proceeding with this invention, it is necessary to either provide the breather opening of an engine with threads of a type to receive my filter unit or to provide an adaptor which may be positioned in a breather opening which will have a threaded end for the reception of the filter. The filter is then constructed of a shell in which the filter element is located with openings in the upper portion of the shell for the entrance of air which will pass through the filter element and pass out of the shell through the lower portion thereof, either into the breather opening or through the adaptor which is in the breather opening.

With reference to the drawings, 10 designates a fragmental portion of an internal combustion engine which has extending therefrom a breather opening 11 in the form of a cylindrical member which may be used for pouring lubricating oil into the crankcase and may have a closure cap therefor. The filter is designated generally 12 and has an adaptor 13 positioned at one end thereof.

The cylindrical member 11 usually has no threaded portion or means for directly attaching the filter 12 thereto and consequently the adaptor 13 consists of a cylindrical neck 14 which is split at 15 so that the same may be reduced somewhat in size and when reduced will tend to enlarge or expand so as to snugly fit the inside of the cylindrical member 11. The upper end of this adaptor 16 is in generally the form of a cup which has threads 17 pressed into it for the reception of the air filter designated as a whole 12. In some cases the filler opening 11' as shown in Fig. 4 may have its upper end threaded.

This air filter 12 as shown as comprising a shell having cylindrical side wall 20 which has an imperforate top wall 21 rolled over its upper edge 22, while a bottom wall 23 is rolled over the side wall 20 as at 24 and is provided with a downwardly extending neck 25 providing an opening 26, this neck having impressed into its wall threads 27 so that it may be screwed into engagement with the threads 17 of the cup 16. Openings at the upper portion of the shell are designated 30 and 31, which are formed by deflecting portions 32 of the wall 20 outwardly and other adjacent portions of the wall inwardly as at 33 so as to provide openings which will direct air inwardly and upwardly of the shell. Between the openings at the upper end of the shell and the opening 26 at the lower portion of the shell, I provide a filter element designated generally 35, which comprises fibers such as cattle tail hair or casein, which are usually curled so that when assembled they provide a mass with many openings through it so that solid particles may be caught in this mass as the air is passed through. In order to confine these fibers in the desired location in the shell, there is an arc shaped foraminous sheet of material 36 at the lower portion of the shell which is flanged as at 37 so as to space it above the bottom wall 23 while at the upper portion of the shell there is a foraminous sheet of material usually of wire mesh screen 38 which is of generally conical shape with its upper domed portion 39 resting against the top wall 21 while its lower flanged edge 40 is positioned beneath one of the inturned walls 33 which is used for providing the openings 31. These two screens serve to hold the fibrous material in the desired location so as to leave the entrance openings 30 and 31 relatively free for the entrance of air thereinto, the air then passing down through the fibrous material and out through the lower opening 26.

In order to increase the dust collecting efficiency of the fibers, they may be treated with some chemical to which dust particles will adhere and in order that the chemical may also be not inflammable, I desire to use tricresyl phosphate.

It may be desirable to have a different shape of filtering media and in Figs. 5 and 6 I have illustrated the details of this modified form. The shell designated generally 12 is the same as the shell illustrated in Fig. 2. Duplicate screens 45, 45' are provided, each having an annular flange 46 extending downwardly from the screen. The upper screen is lodged beneath the inturned portion 33 of the shell so that it is limited in its upward movement. The filter material designated 35 is lodged between this upper screen 45 and the lower screen 45', the flanges 46' of which lower screen rest upon the bottom wall 23. However, in the case of Fig. 5, a piece of fabric having substantially a count of 32 x 28 and designated 50 is positioned as shown in Fig. 6 between the lower edge 47 of the shell 12 and the screen 45' and a flange 48 of the bottom wall 23. This arrangement will engage this fabric 50 between the inclined portions 47, 48 so that when the lower edge of the flange 48 is rolled as at 24 (Fig. 5) the fabric will be bound in position by the rolling and will extend snugly across the lower screen 45'. This fabric prevents the filter material or any part of it from being discharged from the shell. It also affords an arrangement whereby but one die is necessary for forming the two duplicate screens.

I claim:

1. In combination with an internal combustion engine having a crankcase with a breather opening through which air enters the crankcase, an air filter of the type to remove a major portion of the solid impurities in the air passed therethrough, having a bottom wall with a cylindrical threaded portion, an adaptor having a threaded cup to receive said bottom wall portion and a portion to be removably positioned in said breather opening.

2. An air filter as in claim 1 wherein said air filter has a shell with an entrance opening located in the side wall of the shell.

3. An air filter as in claim 1 wherein said threaded cup is of a different diameter than said portion removably positioned in said breather opening.

4. An air filter as in claim 1 wherein said air filter has a shell with an entrance opening which comprises a plurality of inwardly and outwardly deflected portions of the side wall of the shell.

5. An air filter as in claim 1 wherein said filter has an element which comprises fibrous material.

6. An air filter as in claim 1 wherein said filter has an element which comprises fibrous material treated with a chemical to cause adhesion thereto of dust particles.

7. An air filter as in claim 1 wherein said filter has an element which comprises fibrous material located between foraminous sheet material.

8. An air filter as in claim 1 wherein said filter has an element which comprises fibrous material located between metallic screens.

JOHN H. STOOTMAN.

REFERENCES CITED

The following references are of record in the file of this patent:

UNITED STATES PATENTS

| Number | Name | Date |
|---|---|---|
| 139,131 | Enos | May 20, 1873 |
| 310,157 | Von Weisenflue | Dec. 30, 1884 |
| 1,464,741 | Bennett | Aug. 14, 1923 |
| 1,561,928 | Jaquith | Nov. 17, 1925 |
| 1,792,824 | Dearborn | Feb. 17, 1931 |
| 2,073,156 | Kamrath | Mar. 9, 1937 |
| 2,154,072 | Kamrath | Apr. 11, 1939 |
| 2,187,264 | Carlson | Jan. 16, 1940 |
| 2,187,265 | Carlson | Jan. 16, 1940 |
| 2,243,866 | Kamrath | June 3, 1941 |

FOREIGN PATENTS

| Number | Country | Date |
|---|---|---|
| 199,297 | Great Britain | June 21, 1923 |